A. G. LANGDON.
FRICTION CLUTCH.
APPLICATION FILED APR. 12, 1917.
1,320,246. Patented Oct. 28, 1919.
2 SHEETS—SHEET 1.
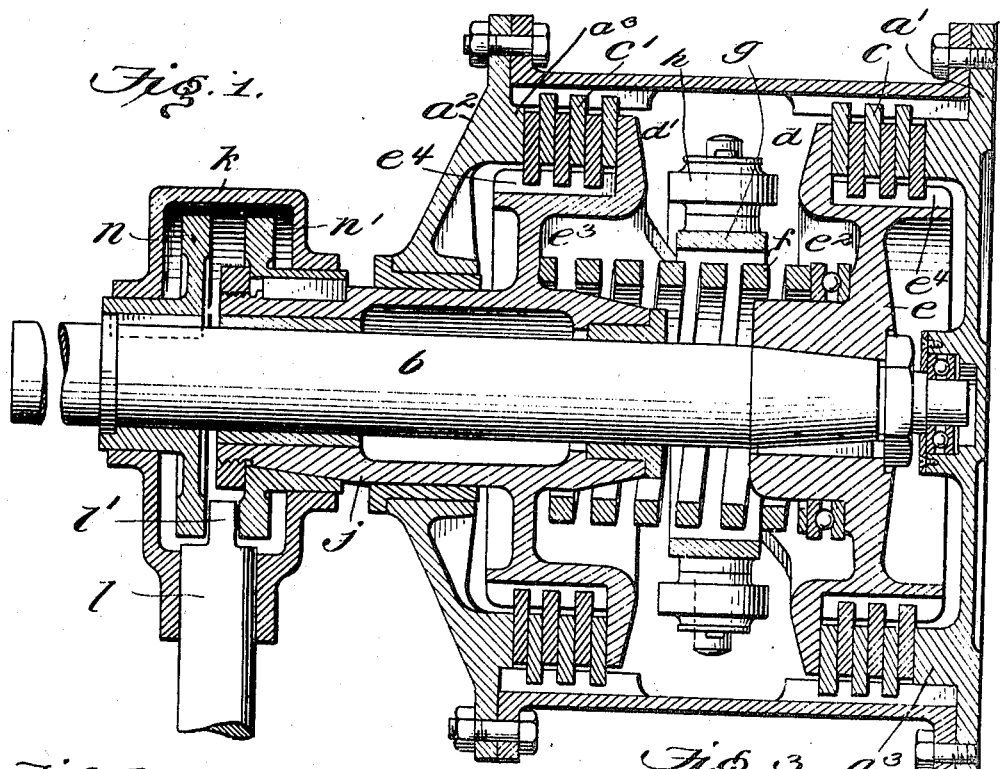
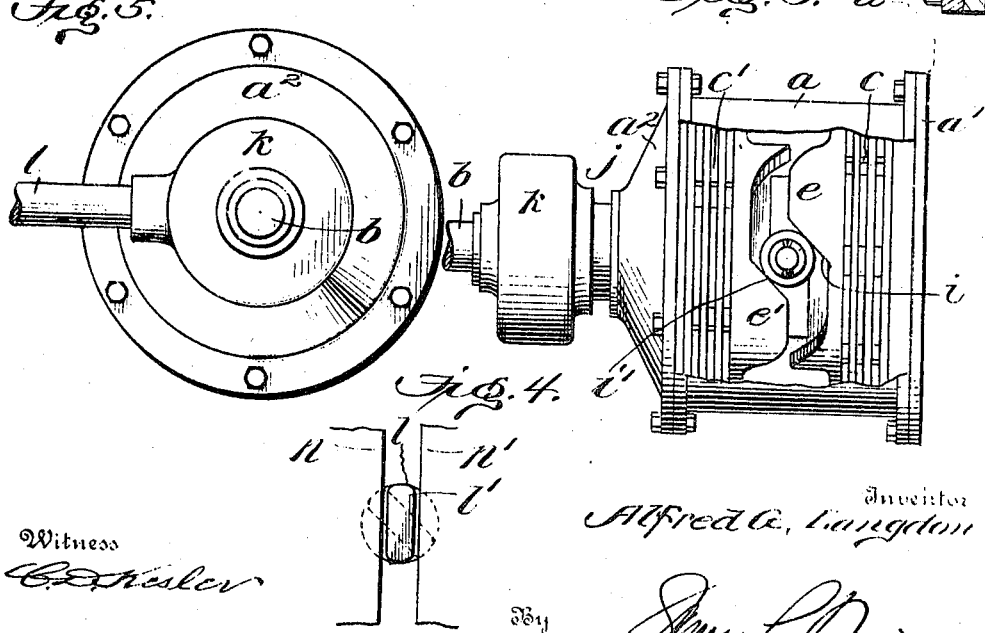

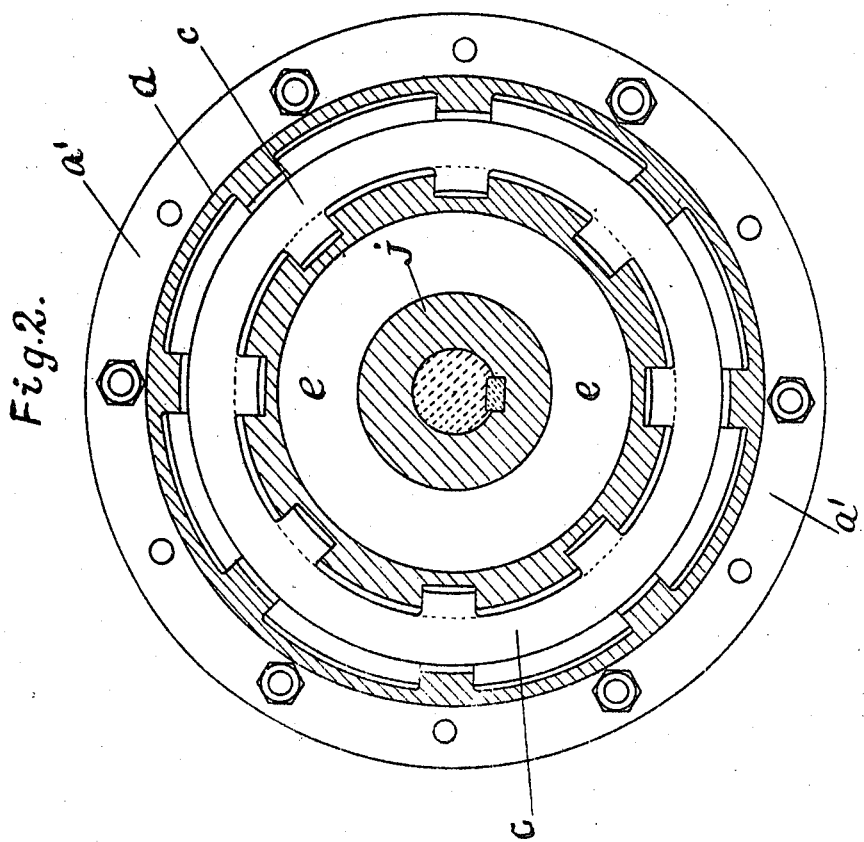

UNITED STATES PATENT OFFICE.

ALFRED GEORGE LANGDON, OF NORTHAM, ENGLAND.

FRICTION-CLUTCH.

1,320,246.    Specification of Letters Patent.    Patented Oct. 28, 1919.

Application filed April 12, 1917. Serial No. 161,645.

*To all whom it may concern:*

Be it known that I, ALFRED GEORGE LANGDON, a subject of the King of Great Britain, residing at Bond street, Northam, in the county borough of Southampton, England, have invented certain new and useful Improvements in or Connected with Friction-Clutches, of which the following is a specification.

This invention relates to friction clutches of the Weston plate or disk type, and as additions to application for British Patent No. 9018/1916, and as disclosed by British specifications Nos. 21783/1913, and 28676/1913, and has for its object to provide a simple and more efficient arrangement of parts.

The invention comprises certain improvements adapted to the structural combination of a casing in which the operating parts are inclosed, friction disks of the Weston type, a spring and associated means for causing said disks to connect the driving and driven parts and means whereby the friction of the disks can be relieved, as required.

For power transmission operations the casing rotates with the driving shaft but by making the casing fixed, as by its attachment to some stationary part, the device may be adapted as a brake.

The invention, generally stated, consists in a structure wherein the spring acts on a disk member which is rotatable, and also slidable, relatively to the casing and which, in turn acts on the friction disks and wherein the disk member has annular channels on its opposite faces, the inner channel being adapted to receive the end of the spring and the outer channel being adapted to receive the friction disks. In the preferred construction there are two series of Weston disks, one at each end of the casing and two disk members for coöperation with said disks, the spring being arranged between said disk members.

In the accompanying drawings I have illustrated a clutch embodying an arrangement and construction of the above parts comprising the several features of my invention, which I will now describe.

Figure 1 shows the friction clutch in sectional elevation, and in its normal position when in action.

Fig. 2 is an end view of Fig. 1 with the cover removed, showing the Weston disks in position.

Fig. 3 is a plan view, to a reduced scale, of Fig. 1, with the upper portion of the casing removed, and showing the disks, also the inclines and rollers.

Figs. 4 and 5 are details illustrating the operating gear.

With reference to the drawings, $a$ denotes the casing of the clutch, and $a^1$ denotes the end plate of the casing by which the clutch may be connected to the fly wheel of a motor-engine, or directly to the shaft of a driving engine or motor, or to a belt pulley or the like. $a^2$ designates the after end plate of the casing, and $b$ designates the shaft to be driven, said shaft being axially slidable relatively to the casing $a$. $c$, $c^1$ denote the duplex nests of friction disks of the Weston type; the disks are made alternately of phosphor bronze and mild steel, or cast iron, and are arranged within outer annular channels $e^4$ of the disk members $e$, $e^1$ and between the flanges $a^3$ of the heads $a^1$, $a^2$ and the inwardly offset peripheral flanges $d$, $d^1$ of said disk members $e$, $e^1$. These disk members $e$, $e^1$ are provided with inner annular channels $e^2$, $e^3$, between which there is mounted a spiral spring $f$ in the preferred construction; this spiral spring is surrounded by a ring $g$ on which are mounted rollers $h$; these rollers $h$ are adapted to bear on the inclines $i$, $i^1$ provided on the disk members $e$, $e^1$. In the embodiment disclosed the member $e^1$ is slidable on the shaft $b$ and the member $e$ is fast on said shaft. $j$ denotes a sliding sleeve member which forms part of the disk member $e^1$, the latter as it slides on the shaft $b$, serving to apply pressure to, or remove pressure from, the friction disks $c$, $c^1$. This sliding sleeve, together with the disk members $e$, $e^1$ causes the rollers $h$ to apply or remove pressure from the Weston disks $c$, $c^1$ as the clutch is operated. The spiral spring $f$, which is placed between the front end of the sleeve member $j$ and the back part of the disk member $e$, against which it bears, provides for the reaction, which places the parts in their normal position.

The clutch elements are shown in their engaged relation in which the spring $f$ presses the disks $e$, $e^1$ toward the respective casing heads $a^1$, $a^2$. During the first revolutions of the driven part, i. e. the shaft $b$, the disks $e$, $e^1$ are liable to slip in the casing but the engagement of the rollers $h$ on the inclines $i$, $i^1$ is effective to prevent further slipping, said rollers thereby positively pressing the disks $e$, $e^1$ toward the heads $a^1$, $a^2$ and insuring the strongest frictional mutual engagement of the coacting bearing surfaces of the disks $c$, $c^1$, flanges $d$, $d^1$ and the flanges $a^3$. Obviously the greater the torsional stress the greater will be the grip of the bearing surfaces.

The operating device is contained in the casing $k$, and comprises two sleeve disks $n$, $n^1$, the disk $n^1$ being keyed to the sleeve $j$, and the disk $n$ being keyed to the shaft $b$. $l$ denotes the operating rod, the end $l^1$ of which is cut on each side as shown in Figs. 1 and 4, so that the projecting end $l^1$ fits between the disks $n$, $n^1$. To disengage the clutch elements the rod $l$ is turned whereby to move the disks $n$, $n^1$ away from one another. The sleeve $j$ is moved with the disk $n^1$ and is forced against the spring $f$, while the disk $n$ forces back the shaft $b$. In this way the spring $f$ is put under compression while at the same time the pressure on the Weston disks is released and the shaft $b$ runs free.

Having thus described my invention, what I claim as new therein, and desire to secure by Letters Patent is:—

In a friction clutch, a casing in which the operating parts are inclosed and which has end heads, disk members rotatable relatively to said casing and movable toward and from said end heads, a spring urging said disk members toward said heads, means for moving said disk members from said heads and against the pressure of said spring and coacting friction disks for coöperation with said disk members and said end heads, each disk member having an inwardly offset peripheral flange to provide an inner and outer channel in its respective opposite faces, the spring being arranged between the disk members with its ends fitted in the inner channels and the friction disks being arranged in the outer channels and between said flanges and said end heads.

In testimony whereof I have hereunto set my hand in presence of two subscribing witnesses.

ALFRED GEORGE LANGDON.

Witnesses:
FREDERICK J. CHEESBROUGH,
HARVEY J. BAVERSTOCK.